(12) United States Patent
van Raam et al.

(10) Patent No.: US 10,718,090 B2
(45) Date of Patent: Jul. 21, 2020

(54) SUPPORT STRUCTURE WITH A CONNECTING PLUG

(71) Applicant: Permavoid Limited, Leicester (GB)

(72) Inventors: Carolus Hermanus van Raam, Hoogmade (NL); Andrew Bryan Shuttleworth, Pulton-le Fylde (GB); Paul David Culleton, Warrington (GB)

(73) Assignee: PERMAVOID LIMITED, Leicester (GB)

( * ) Notice: Subject to any disclaimer, the term of this patent is extended or adjusted under 35 U.S.C. 154(b) by 0 days.

(21) Appl. No.: 16/081,145

(22) PCT Filed: Feb. 28, 2017

(86) PCT No.: PCT/EP2017/054601
§ 371 (c)(1),
(2) Date: Aug. 30, 2018

(87) PCT Pub. No.: WO2017/148918
PCT Pub. Date: Sep. 8, 2017

(65) Prior Publication Data
US 2019/0017228 A1  Jan. 17, 2019

(30) Foreign Application Priority Data
Mar. 1, 2016 (NL) ............................ 2016344

(51) Int. Cl.
*E01C 3/00* (2006.01)
*A01K 1/015* (2006.01)

(52) U.S. Cl.
CPC ............ *E01C 3/006* (2013.01); *A01K 1/0151* (2013.01)

(58) Field of Classification Search
CPC .............................. E01C 3/006; A01K 1/0151
See application file for complete search history.

(56) References Cited

U.S. PATENT DOCUMENTS

| | | | | |
|---|---|---|---|---|
| 6,450,125 B2* | 9/2002 | McElroy | ............ | A01K 1/0151 119/527 |
| 6,672,970 B2* | 1/2004 | Barlow | ............ | A63B 69/3661 473/160 |
| 7,147,399 B2* | 12/2006 | Viscount | ............ | A63C 19/062 403/349 |

(Continued)

FOREIGN PATENT DOCUMENTS

| DE | 9209520 U1 | 9/1992 |
|---|---|---|
| FR | 2804150 A1 | 7/2001 |

(Continued)

OTHER PUBLICATIONS

International Search Report from PCT/EP2017/054601 dated May 9, 2017.

*Primary Examiner* — Andrew J Triggs
(74) *Attorney, Agent, or Firm* — Adsero IP (57) ABSTRACT

Support structure for a surface area, comprising an array of base elements, interconnected for forming the base structure defining a deck, the base elements comprising at least one void for receiving a fluid and wherein the deck is provided with openings for passing fluids into and/or from said void and/or openings for interconnecting the base elements, wherein in at least one of said openings a plug has been provided, said plug provided with a connector for connecting an artefact to said plug.

16 Claims, 12 Drawing Sheets

(56) References Cited

U.S. PATENT DOCUMENTS

| | | | | |
|---|---|---|---|---|
| 7,303,800 B2* | 12/2007 | Rogers | B32B 3/02 | 428/44 |
| 7,930,859 B1* | 4/2011 | Eslambolchi | E01F 9/629 | 248/159 |
| 8,132,385 B2* | 3/2012 | Phillips | E04C 2/427 | 119/509 |
| 8,683,769 B2* | 4/2014 | Cerny | E01C 5/001 | 404/36 |
| 8,881,482 B2* | 11/2014 | Cerny | E04F 15/02038 | 52/582.2 |
| 8,936,374 B1* | 1/2015 | Royse | F21V 33/006 | 362/153 |
| 8,985,903 B1 | 3/2015 | Frith | | |
| 9,249,570 B2* | 2/2016 | Jean | E04B 5/023 | |
| 9,506,255 B1* | 11/2016 | Jones | E01C 9/086 | |
| 9,885,156 B2* | 2/2018 | Malmquist | E01C 5/003 | |
| 10,024,075 B2* | 7/2018 | McDowell | E04F 11/1865 | |
| 10,156,045 B2* | 12/2018 | Penland | E01C 5/18 | |
| 2004/0005430 A1* | 1/2004 | Rogers | B32B 3/02 | 428/44 |
| 2007/0193163 A1* | 8/2007 | Busby | E04F 15/08 | 52/389 |
| 2008/0295437 A1* | 12/2008 | Dagger | E04F 15/02 | 52/584.1 |
| 2011/0290171 A1* | 12/2011 | Brick | E04H 12/2238 | 116/173 |
| 2012/0121328 A1 | 5/2012 | White | | |
| 2017/0241084 A1* | 8/2017 | Else | E01C 5/005 | |
| 2019/0017228 A1* | 1/2019 | van Raam | A01G 13/0268 | |

FOREIGN PATENT DOCUMENTS

| | | |
|---|---|---|
| GB | 2470257 | 11/2010 |
| WO | WO 2002/014608 | 2/2002 |
| WO | WO 2011/007127 | 1/2011 |
| WO | WO 2011/007128 | 1/2011 |
| WO | WO 2015/135972 | 9/2015 |

* cited by examiner

SUPPORT STRUCTURE WITH A CONNECTING PLUG

RELATED APPLICATIONS

This application is a 35 U.S.C. § 371 national phase application of PCT/EP2017/054601 (WO 2017/148918), filed on Feb. 28, 2017, entitled "Support Structure with a Connecting Plug", which application claims priority to Netherlands Application No. 2016344, filed Mar. 1, 2016, which is incorporated herein by reference in its entirety.

The invention relates to a support structure for a surface area. The invention relates to a support structure comprising an array of base elements, each provided with a void below a deck, said base elements being interconnected.

Support structures for surface areas, such as recreational areas, fields, sports fields, crop growing areas, floors, pavements, drainage, animal shelters and the like are known from for example WO0214608, WO2011/007128, WO2011/007127 and WO2015/135972. These support structures have in common that they are basically formed by base elements having a relatively open structure, comprising a void below a deck. The base elements are interconnected by suitable connectors, such that the support structure as such is relatively rigid and light, and can hold a volume of fluid. In practice depending on the intended use of the area at least one cover layer will be provided over the deck of the support structure, whereas the base structure may be placed directly on a supporting area, such as a base or subbase, or other layers may be provided below said support structure.

DE9209520 discloses a tile system for surface covering, having a flexible deck carried by a matrix of support elements extending from a bottom side of the deck supporting the deck spaced apart from a sub structure. Water can pass through water openings in the deck to between the support elements. On the upper side of the deck also protrusions are provided, extending upward. Four such tiles can be interconnected by placing a square plate having four square holes over a corner one of the elements on the deck of four adjacent tiles. The plate is connected to said four tiles by attachment elements pushed though said plate and one of said water openings of each of said four tiles.

U.S. Pat. No. 8,985,903 discloses a substantially cubic drainage box, folded from flat foldable frames which are connected to each other in inverted position. The inside of the box is hollow, without any supporting columns.

US2007/193163 discloses an outdoor patio flooring system using flat, grid like elements, supported on beams and covered by tiles. Fastener elements 18 are provided inside some of the openings through which a nail can be driven for securing the elements to the beams. Tiles are then glued over said elements and over the fastener elements too, covering them entirely. There is no disclosure in this document of a volume for holding water in said elements, below the deck or connecting elements for interconnecting the elements.

FR2804150 discloses a plancher provided with longitudinal slots to which a plate with a leg can be mounted using a T-shaped connector. The bar of the T can be placed below the plancher having a threaded leg extending through a slot to above the plancher, and through a slot of the plate. A nut is then screwed onto the screw threaded leg. There is no disclosure of interconnected modules, nor of a deck supported by pillars or columns, wherein a volume for receiving water is provided in such module, below a deck.

There is a need for mounting artefacts to such surface areas in order to improve the practical use of the surface area. Such mounting may be permanent or temporary. The present disclosure provides for a simple and flexible means for such mounting.

In an aspect a support structure according to the disclosure can comprise an array of base elements, interconnected for forming the base structure defining a deck, the base elements comprising at least one void for receiving a fluid and wherein the deck is provided with openings for passing fluids into and/or from said void and/or openings for interconnecting the base elements. Such support structure is known in the art as for example cited here above. According to the present disclosure in at least one of said openings a plug can be provided, said plug provided with a connector for connecting an artefact to said plug.

The at least one plug is preferably releasable connected to a base element, such that plugs can be provided in said deck where they are needed. The connector is preferably accessible from an upper side of the deck. The at least one plug has an upper end which is preferably flush with or below an upper side of said deck, such that it does not interfere with a cover layer provided on the deck or normal use of said deck.

In embodiments a plug can be provided with at least one wing element with which the plug can be locked in the at least one opening, for example similar to a bayonet lock. The at least one wing element can be provided in and/or on a plug body of the plug, such that the plug can be rotated around a longitudinal axis of the plug body, between a first, locking position and a second, unlocking position. The at least one wing can in the locking position for example extend below the deck or in or below a part of the base element below said deck, for example a bottom structure. Additionally or alternatively the plug can be provided with other locking provisions for locking the plug in said opening, for example such that the plug body increases in volume by inserting a connecting element of an artefact into said plug, similar to a wall plug. The connector can in embodiments be provided by way of screw threads or bayonet locking elements, for example in an insert provided in the plug body. Other connectors can also be provided, for example a connecting ring, a click provision, a press fit provision. The plug can be part of, for example integral to an artefact.

In an aspect of the present disclosure a plug can have a lower end portion which can be supported in and/or on a part of the base element below said opening. More generally the plug and base elements can be provided with at least one provision for cooperation between the plug and the base element such that movement of the plug in an insertion direction into the opening is limited. In embodiments the plug and/or base element may be designed such that in order to lock the plug in the first position at least one of the plug and the base element has to be forced into position, for example by resiliently deforming the plug and/or the base element. In the embodiments the plug can have a longitudinal axis which extends substantially perpendicular to the surface of the deck.

In an aspect of the present disclosure a base element or module can be made by injection moulding from plastic, preferably in a single shot moulding. The base elements can have a deck and a bottom structure, spaced apart by columns which may be open towards the deck. In embodiments the base elements may comprise a deck and a bottom structure, interconnected by at least an array of columns, open to at least the deck side of the base element, wherein the deck comprises a series of pairs of preferably substantially parallel upper rib elements extending between adjacent columns, wherein the bottom structure comprises a series of lower rib elements extending between adjacent columns, such that in top view of the base elements the lower rib element extends between a pair of upper rib elements. In embodiments of at least one pair of upper rib elements each of the upper rib elements comprises a curved portion at a position between said two adjacent columns, such that the curved portions between them define at least part of an opening, wherein the curved portions preferably each form a circle segment. The plug can then be inserted into the opening, with for example a wing element extending between the ribs of said pair, such that when the plug is rotated, said at least one wing will be forced under one of the upper ribs of the pair. The plug may be provide with a head portion extending between and fitting snugly within the curved portions, substantially preventing lateral movement of the plug.

In an aspect the disclosure is related to a plug for use in a support structure of the disclosure, or with a base element according to the disclosure.

In an aspect the disclosure is related to an artefact connected to the support structure by connecting to the connecting element of the at least one plug, wherein the artefact is preferably supported at least partly by said support structure.

In further elucidation of the present invention embodiments of the present disclosure, such as embodiments of a support structure for a surface area as well as areas formed therewith, as well as methods for forming the same shall be described hereafter, with reference to the drawings. In the description a base element for a structure of this disclosure will also be referred to as module.

In this description embodiments of the invention will be described with reference to the drawings by way of example only. These embodiments should by no means be understood as limiting the scope of the disclosure. At least all combinations of elements and features of the embodiments shown are also considered to have been disclosed herein. In this description the same or similar elements and features will be referred to by the same or similar reference signs.

In this description expressions of orientation such as top, bottom, vertical etcetera are used for convenience only and refer to the orientation of the module as seen in the accompanying drawings. Such expressions are not to be regarded as limiting the orientation of the module in use, and indeed, as will be described below, modules according to the description can be used in other orientations, including at least at sloping surfaces.

In this description a cover should be understood as meaning at least a layer or a set of layers of one or more materials, providing a surface for forming a surface area, such as but not limited to recreational areas, fields, sports fields, crop growing areas, floors, pavements, drainage, animal shelters and the like. Such cover may comprise or be formed by a cover layer. Such cover may comprise a top layer providing for such surface or may comprise a top layer and a cover layer on such top layer. Moreover such cover may comprise a layer or membrane on a substructure. A surface of the cover can form a surface for performing sports on.

In this description a substructure has to be understood as any artificial or natural surface on which modules according to the description can be placed and supported, either directly or indirectly, such as but not limited to ground, soil, sand, clay or such natural surfaces, or roofs of buildings, or concrete, tarmac, brick or such artificial surfaces.

In this description membrane has to be understood as including but not limited to any kind of woven or non woven sheet or foil, made of any plastic or natural material or mix of materials, including but not limited to plastic sheet or foil, natural fibers, geo-textiles, water permeable and/or water impermeable materials and the like. Preferably the membrane will be flexible, such that it can be placed from a roll or as relatively large sheets, compared to the sizes of the modules to be described. However, the membrane can also be provided in different ways, for example as tiles or as an in situ coating.

In this disclosure a support structure will be described, as well as base elements or modules for forming such structure and plugs for use therewith. The support structure is for forming a surface area, comprising an array of base elements, interconnected for forming the base structure S defining a deck. The base elements may comprise at least one void for receiving a fluid such as water, urine chemicals or the like. The deck is provided with openings for passing fluids into and/or from said void and/or openings for interconnecting the base elements. In at least one of said openings a plug has been provided, said plug provided with a connector for connecting an artefact to said plug. In this description an artefact is to be understood as any element or combination of elements at least partly man made which is to be used on or with said surface area. Such artefact can for example be but is not limited to a bracket, pole, board, flooring, wall, post, boarding, fence, rail, sports product, restraining element or the like.

In this disclosure a support structure for a surface area can comprise an array of base elements, interconnected for forming the base structure defining a deck, the base elements comprising at least one void for receiving a fluid and wherein the deck is provided with openings for passing fluids into and/or from said void and/or openings for interconnecting the base elements, wherein in at least one of said openings a plug has been provided, said plug provided with a connector for connecting an artefact to said plug, wherein each base element comprise a deck and an bottom structure, interconnected by at least an array of pillars, (and) wherein the bottom structure comprises a series of intersecting rib elements, wherein at least one of said rib elements is provided with a support element directly below an opening in said deck.

In this disclosure a base element can comprise a deck and a bottom structure, interconnected by at least an array of columns, open to at least the deck side of the base element, wherein the deck comprises a series of pairs of preferably substantially parallel upper rib elements extending between adjacent columns, wherein the bottom structure comprises a series of lower rib elements extending between adjacent columns, such that in top view of the base elements the lower rib element extends between a pair of upper rib elements.

Figure 1:
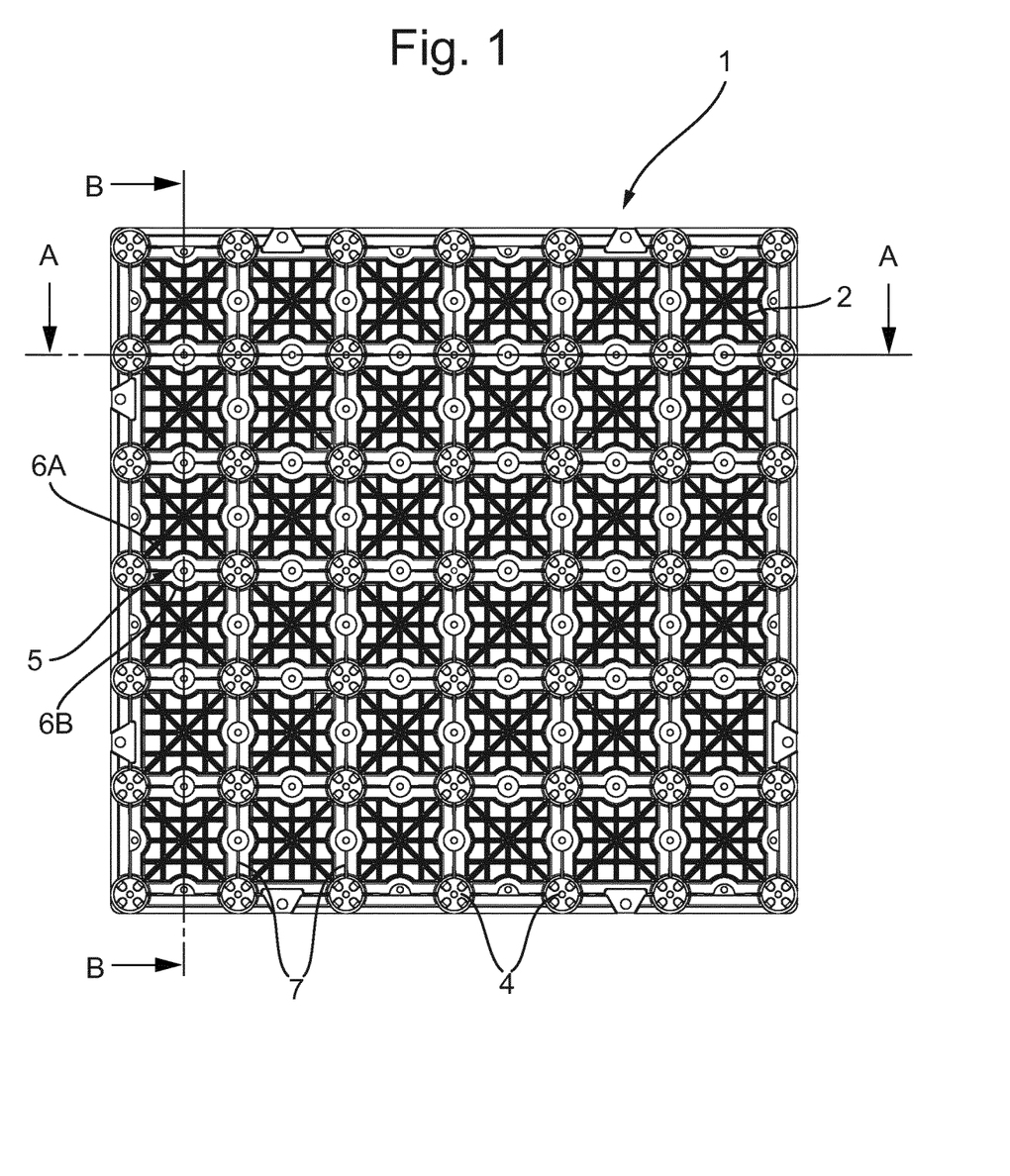
FIG. 1 shows in top view an embodiment of a base element.
Figure 1A:
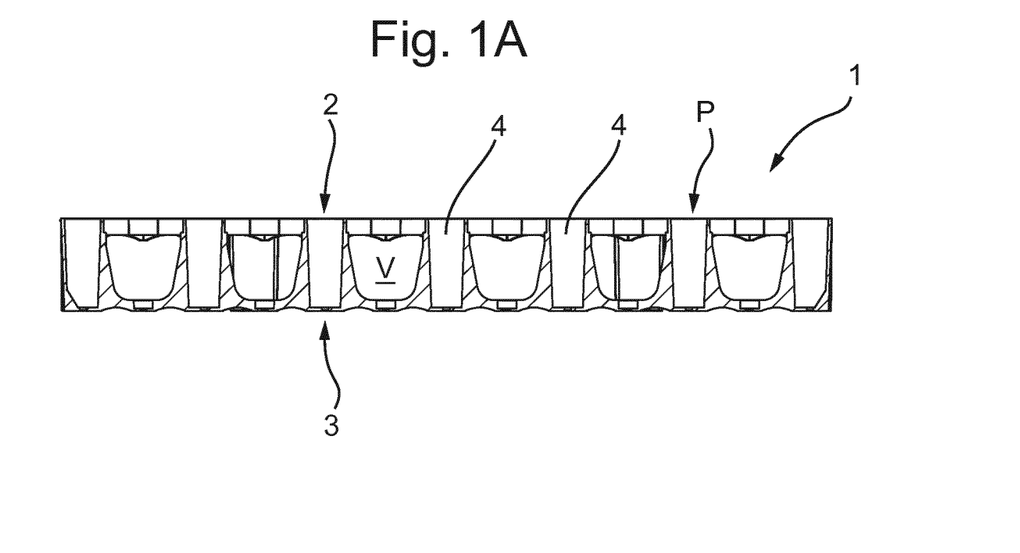
FIGS. 1A and 1B show cross sections of the base element along the lines IA-IA and IB-IB in FIG. 1.
Figure 1B:
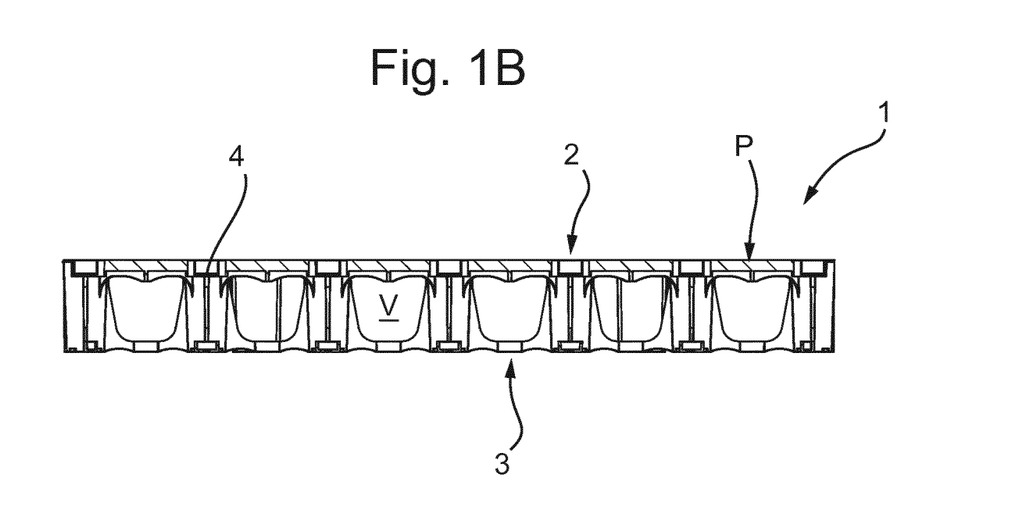
Figure 3:
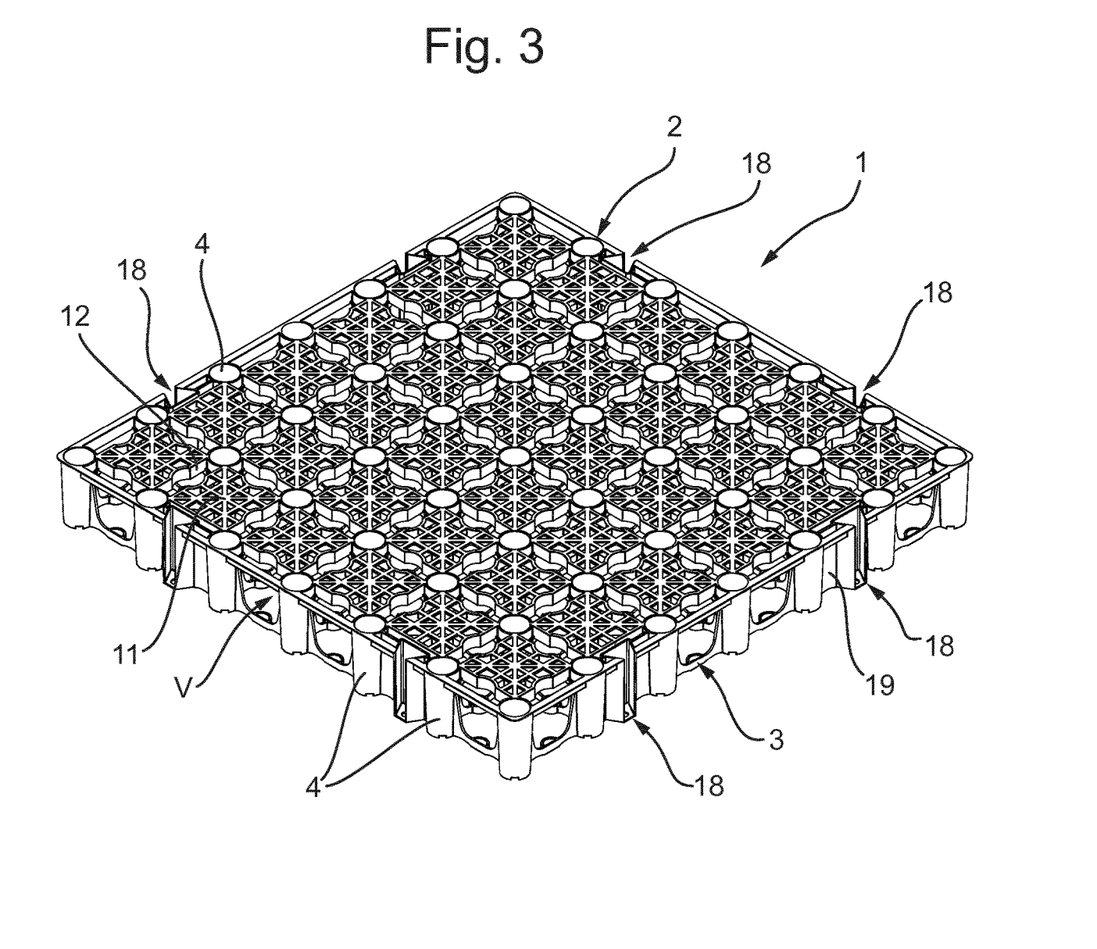
FIG. 3 is perspective view a base element of FIG. 1.

FIG. 1 shows a base element or module 1 seen from a top, which is preferably made of plastic. FIG. 3 shows the module or base element in perspective view, from above. The module 1 may be made by injection moulding, preferably single shot moulding. In this embodiment the module or base element 1 has a substantially rectangular shape, which may be substantially square. The base element 1 in this embodiment comprises a deck 2 and a bottom structure 3, interconnected by at least an array of columns 4. The columns are preferably hollow and can be open to at least the deck 2. The deck 2 comprises a series of pairs 5 of upper rib elements 6A, 6B extending between adjacent columns 4. The bottom structure 3 can comprise a series of lower rib elements 7 extending between adjacent columns 4. In a preferable embodiment in top view of the base elements 1 a lower rib element 7 may extends between a pair 5 of upper rib elements 6A, 6B. The ribs 6A, 6B in each pair 5 preferably extend preferably substantially parallel to each other.

In embodiments at least one pair 5 of upper rib elements 6A, 6B each of the upper rib elements 6A, 6B comprises a curved portion 8 at a position between two adjacent columns 4, such that the curved portions 8 between them define at least part of an opening 9. The curved portions preferably each form a circle segment, such that the two portions enclose a circle.

In embodiments, such as for example shown in FIG. 1-5, the columns 4 may define a grid of cells 11. Each cell 11 is bordered by a series of first upper rib elements 6A of a series of pairs 5 of such upper rib elements 6A, 6B extending between the columns 4 defining said cell 11. One such cell 11 is, by way of example only, shown in FIG. 2. Between said first upper rib elements 6A intersecting support ribs 12 are provided. In the embodiment shown a pattern of intersecting support ribs 12A is provided, extending in two perpendicular directions and at right angles between opposite upper rib elements 6, and two diagonal support ribs 12B connecting diagonally opposite columns 4. Similarly cells 11 are defined by the second upper rib elements 6B. The upper side of the ribs 6, 12 and the top of the columns 4 may be level with each other defining substantially the deck or upper surface P of the support structure S. In embodiments directly below each said cell 11 the bottom structure 3 may be open between lower rib elements 7 extending between said columns 4.

Figure 2:
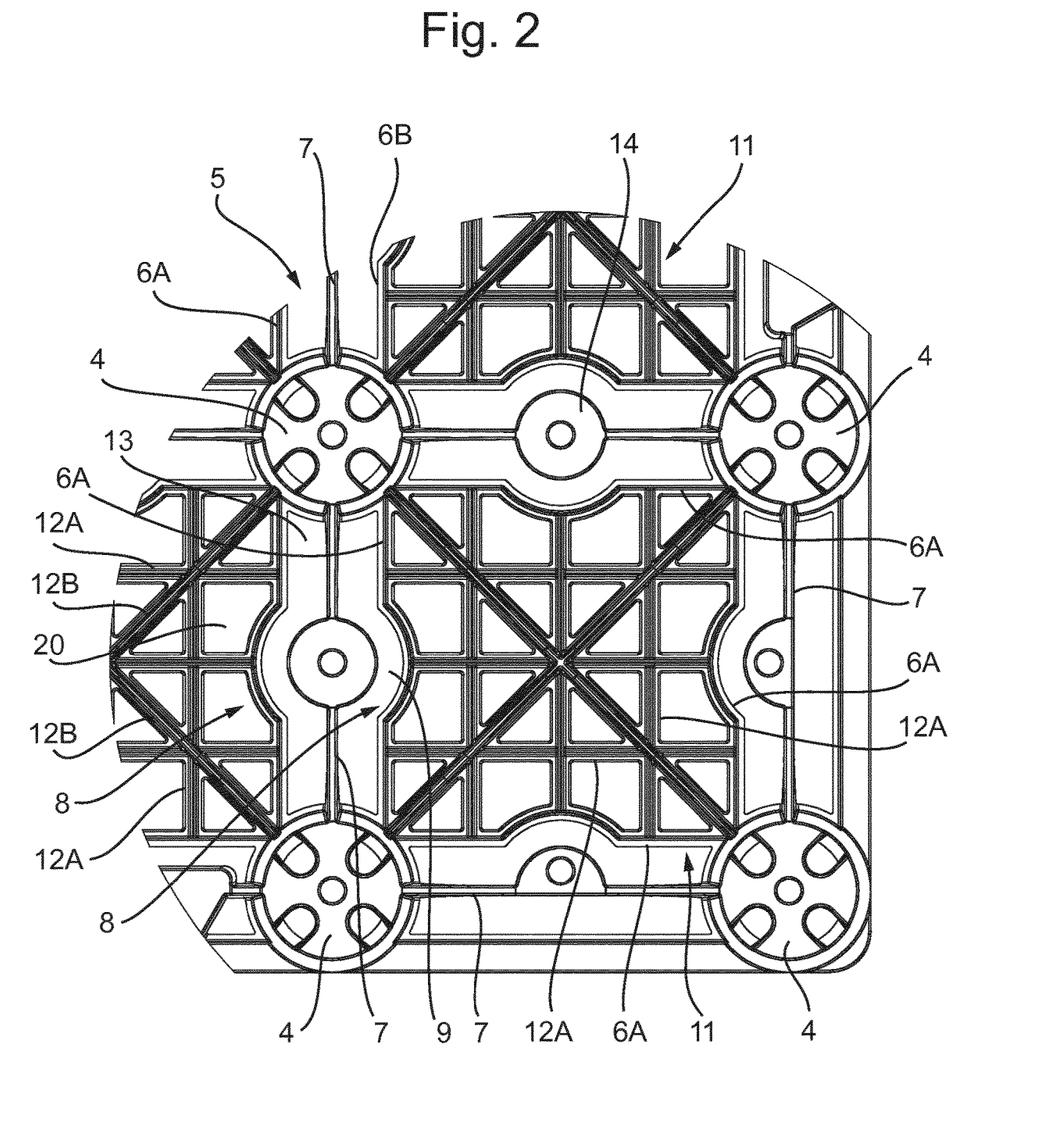
FIG. 2 in top view part of a base element, showing columns, pairs of upper rib elements, a rib structure and a lower rib element.
Figure 2A:
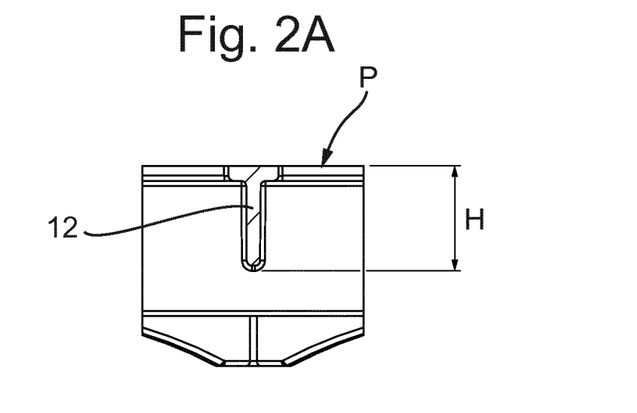
FIGS. 2A and 2B show cross sections of part of a base element of FIG. 1.
Figure 2B:
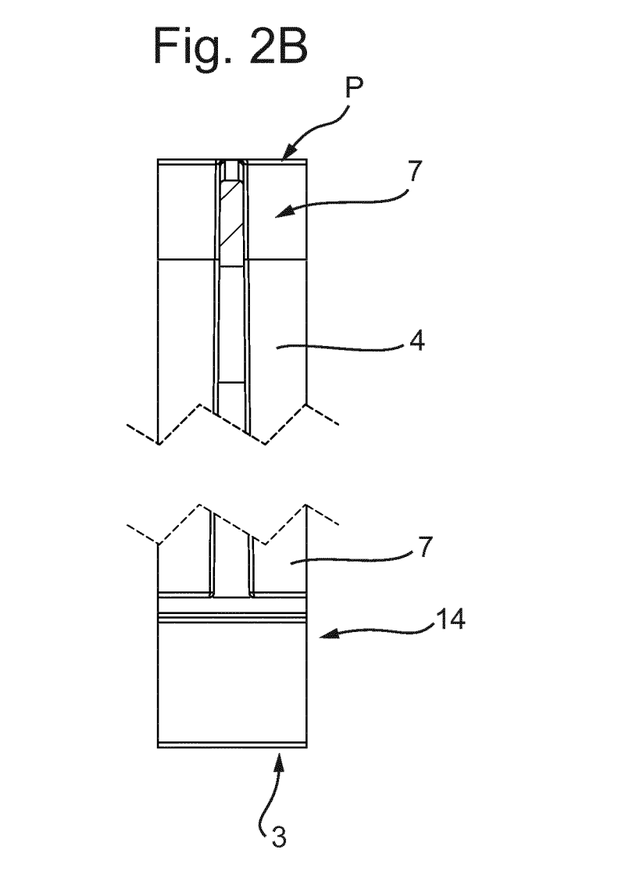

In the embodiment shown in for example FIG. 2 each cell 11 has a rectangular, preferably square shape, extending between four columns 4 at four corners of said cell 11, wherein four upper rib elements 6 of four pairs 5 of such rib elements 6 interconnect said four columns 4 along four sides of said cell 11. Between adjacent cells 11 an open area 13 is enclosed between said facing upper rib elements 6, 6A, 6B of the relevant pair 5 of upper rib elements 6. The lower rib elements 7 in this embodiment extend below said open areas 13 and connect adjacent columns 4. Preferably at least one of the lower rib elements 7 comprises or is provided with a support element 14 below at least one of said openings 9 in said deck 2. In this embodiment shown in FIG. 2 such support element 14 can for example be dish shaped for receiving a lower end 15 of a plug 16 inserted into said opening 9 above it. Thus the support element 14 can prevent the plug 16 being inserted further. FIGS. 2A and B show cross sections as indicated by the arrows.

Figure 4:
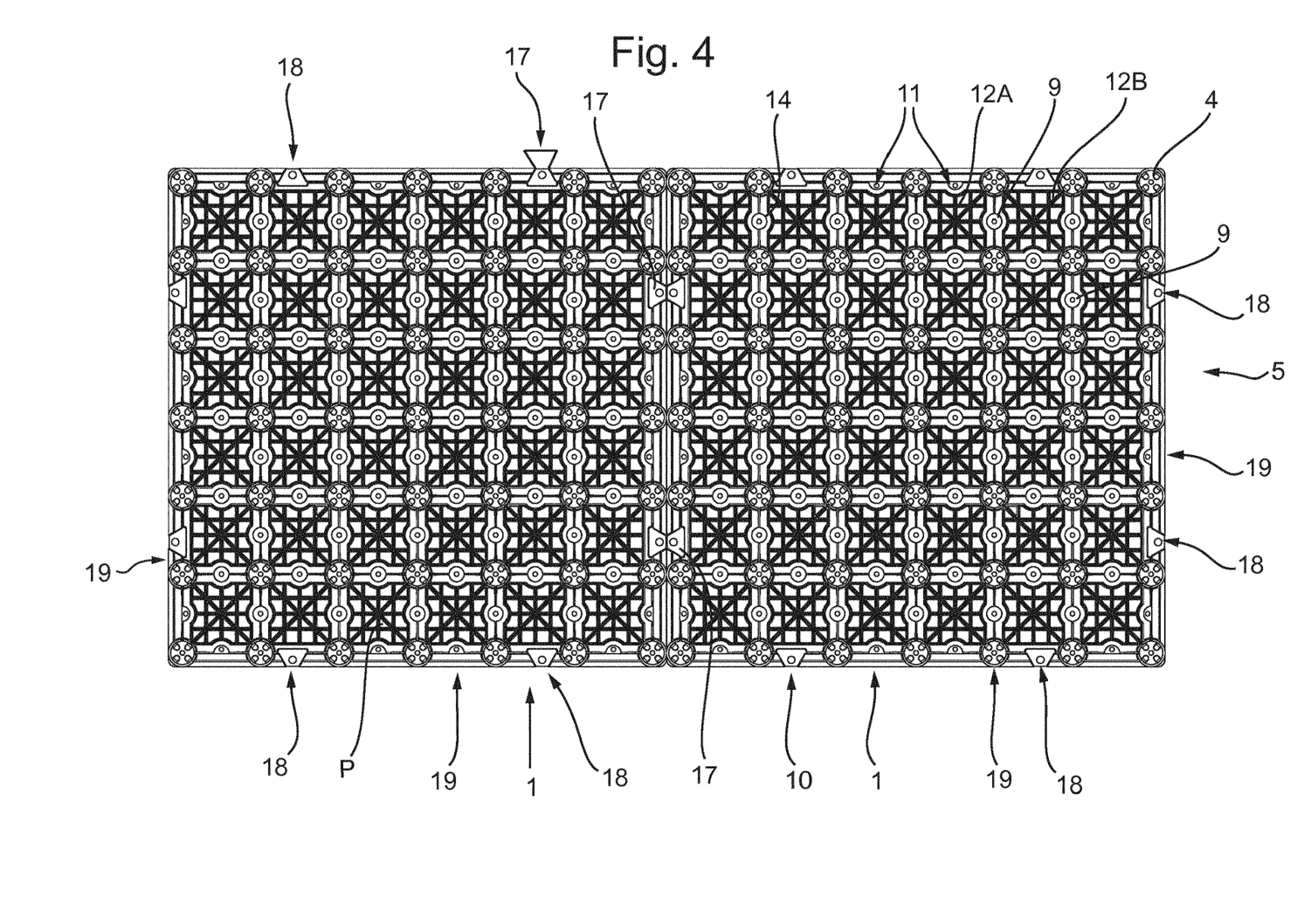
FIG. 4 shows two base elements connected to each other side by side, interconnected by base element connecting elements.

FIG. 4 shows two base elements 1 of an array of rows and columns of such base elements or modules 1 forming a support structure S or at least part thereof. The base elements 1 are interconnected by base element connecting elements 17 inserted into openings or slots 18 provided in the sides 19 of the modules 1. In the embodiment shown the connecting elements 17 are substantially butterfly or double dove tail shaped in cross section, as shown in FIG. 4, whereas the slots 18 have a complementary dove tail cross section, such that when two such slots are positioned next to each other, the connecting element 17 can be forced sliding into the connecting slots, pulling the adjacent modules against each other. This may provide a relatively rigid, raft like support structure. Such connection is known from for example WO0214608, WO2011/007128, WO2011/007127 and WO2015/135972.

As is clear from the drawings in embodiments the bottom structure 3 may be more open than the deck 2. The deck 2 is provided with openings 9 and 18 but also with openings 20 between the ribs 6 and 12, for allowing fluids to pass through the deck into and/or out of the void V formed between deck 2 and bottom structure 3, if so desired. Otherwise the openings 9, 13 and/or 20 can be covered for example by a fluid tight membrane or cover layer.

Figure 5:
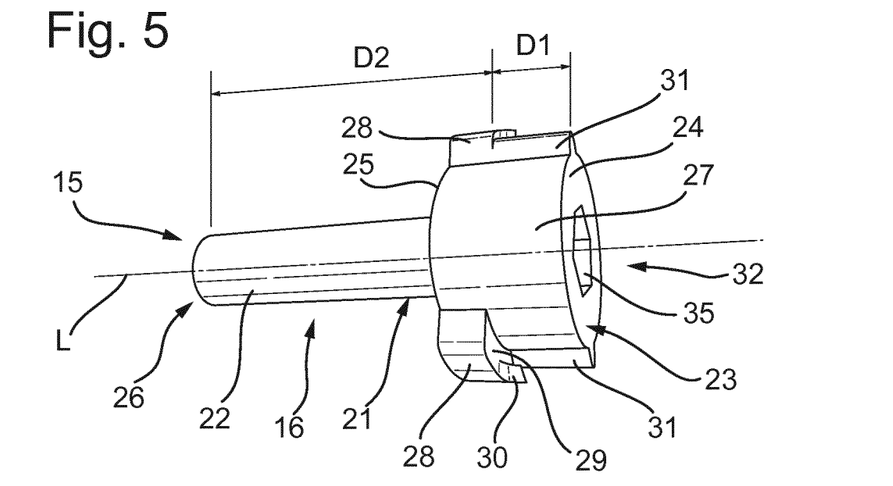
FIG. 5 shows an embodiment of a plug.

According to the invention a plug 16, as shown in FIG. 5 by way of example only, can be mounted in an opening 9. A plug 16 has a plug body 21 having a longitudinal axis L, which in mounted position will preferably extend substantially perpendicular to the deck 2. The plug can be inserted into and, in embodiments, retracted from an opening in the direction of the longitudinal axis and preferably locked and unlocked by rotating the plug 16 around said longitudinal axis L.

Figure 6:
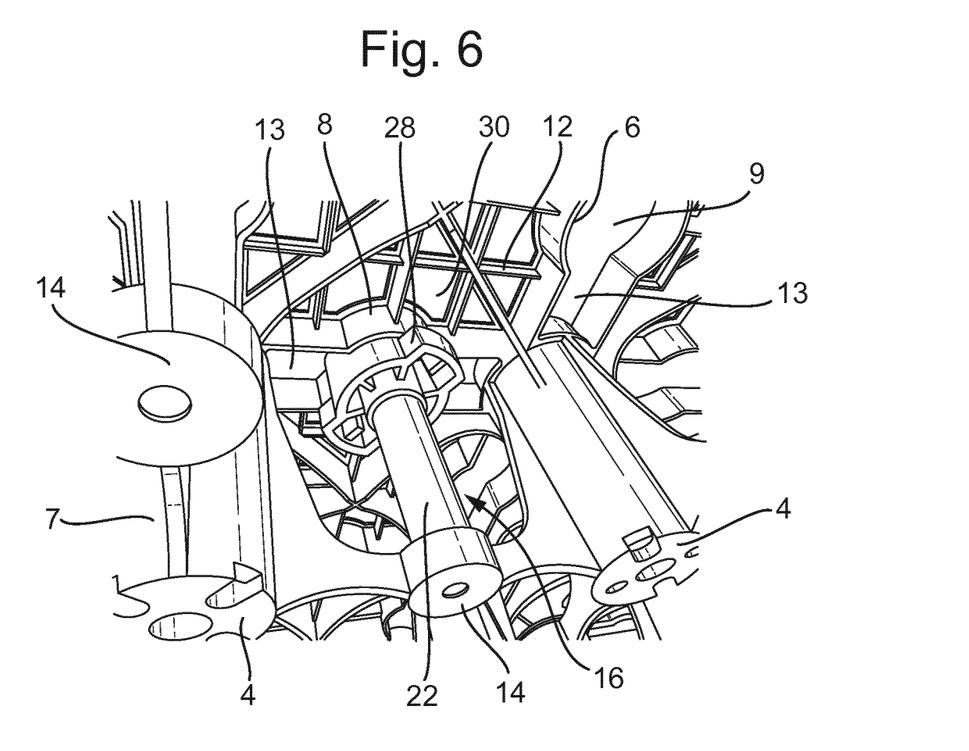
FIG. 6 shows a plug, mounted in an opening in a base element, seen from below.

In the embodiment of FIG. 5 the plug 16 has a substantially cylindrical body 21 comprising a shaft 22 and a head 23, coaxially to the shaft 22. The head 23 has an upper end 24 and a lower end 25. The shaft has a lower end 26 spaced apart from the head 23. The head 23 in this embodiment has a substantially cylindrical outer wall 27 from which near the lower end 25 at least one and, in this embodiment, to wing elements 28 extend outward, from diametrically opposite sides. The distance D1 between the upper end 24 and an upper side 29 of the wing elements 28, measured parallel to the axis L can be substantially the same as the height H (FIG. 2A) of the upper rib elements 6 at the opening 9. The longitudinal length H2 of the shaft 22 may be such that the distance D2 between the upper side 29 of the wing elements 28 and the lower end 26 of the shaft 22 measure along the axis L may be similar to the distance between the lower side of the upper rib element 6 at the opening 9 and the upper side of the support element 14 directly below said opening 9. Thus when the plug is inserted into the opening 9 in a second position, the wing element or elements 28 can pass the opening through the area 13 between the pair 5 of rib elements 6A, 6B next to the curved portions 8, until the lower end 26 hits the support element. Then the plug can be rotated to the first position, forcing the wing elements 28 below the upper rib elements 6 along the opening, locking the plug 16 in position. In FIG. 6 this locking first position is shown from below.

As can be seen in FIG. 5 the wing elements 28 can be provided with locking elements 30 extending from an upper side of the wing elements 28. These locking elements, for example sloping ribs, can be forced passing under the rib elements 6 such that in the locking position these elements extend next to the curved portions 8, in or below a cell 11, preventing undesired rotation back from the locking first position to the second position.

Figure 7:
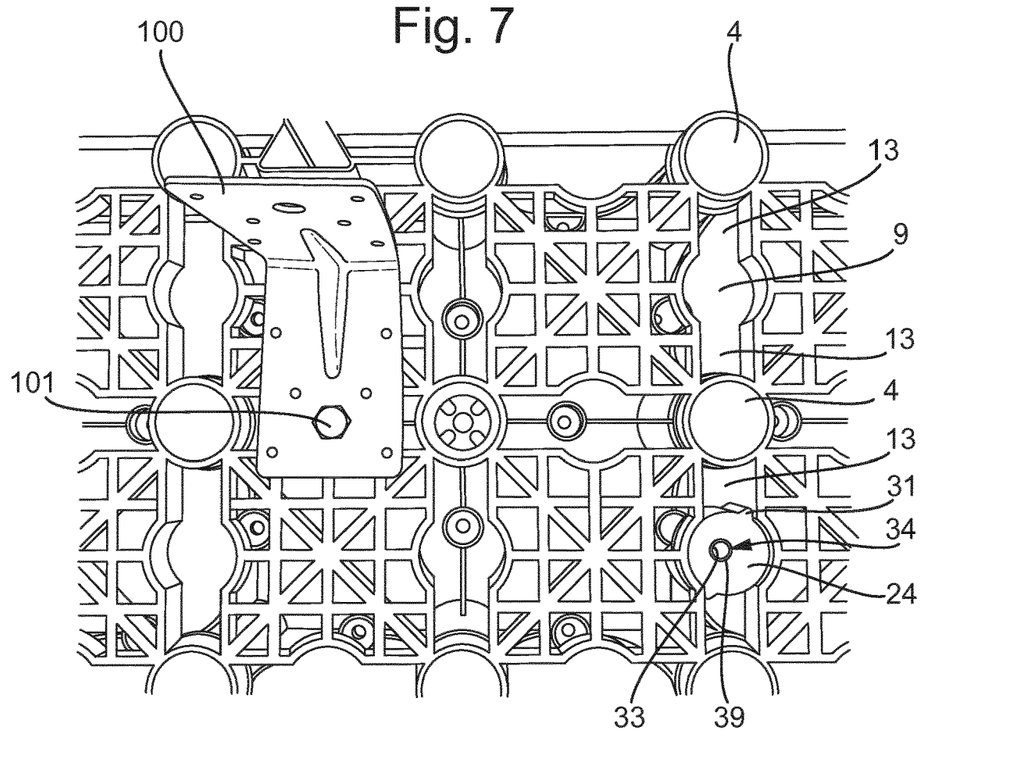
FIG. 7 shows in top view part of a support structure comprising base elements, with a plug mounted in an opening and an artefact mounted on the support structure being connected to a plug in an opening.
Figure 8:
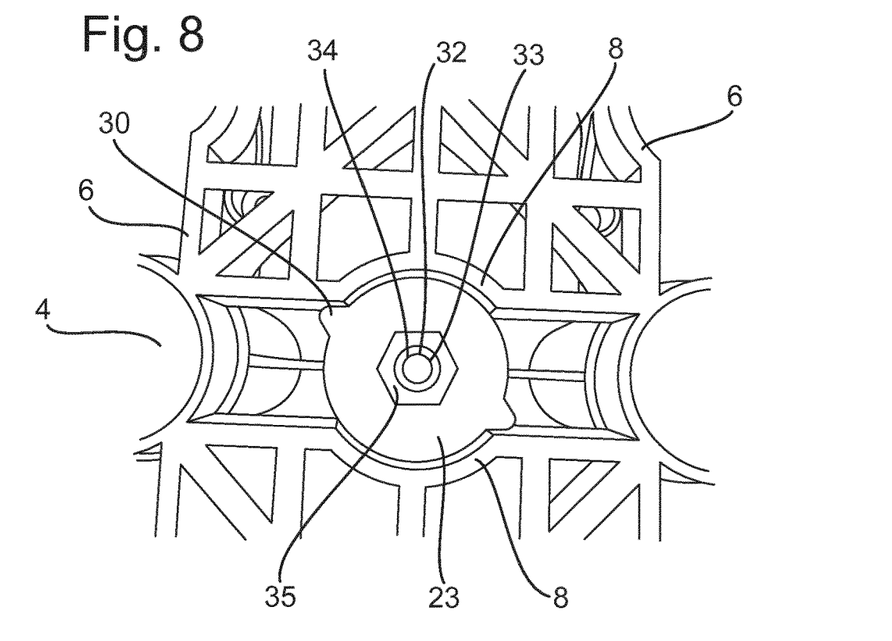
FIG. 8 shows a plug mounted in an opening, seen from above.

As can be seen in for example FIGS. 5, 7 and 8 the head 23 may be provided with for example one or two diametrically oppositely extending stops 31 which may prevent rotation of the plug passed the first position by rotating against the inside of the rib elements 6.

The plug 16 is provided with a connector 32 for connecting an artefact 100 to the plug 16. The connector 32 may for example comprise or be formed by screw threads 33 or bayonet elements, or an opening inside the plug 16. In embodiments the plug 16 can be made of a plastic material, the connector being provided as or by an insert 34 inserted into or insert moulded in said plug 16. The connector 32 is preferably accessible from the top, i.e. from the upper side of the head when the plug has been inserted into the opening, such that for example a screw or bolt 101 can be screwed into the plug 16. Alternatively the connector can for example be a bolt or eye or the like. The plug 16 can be provided as part of an artefact 100.

Figure 10:
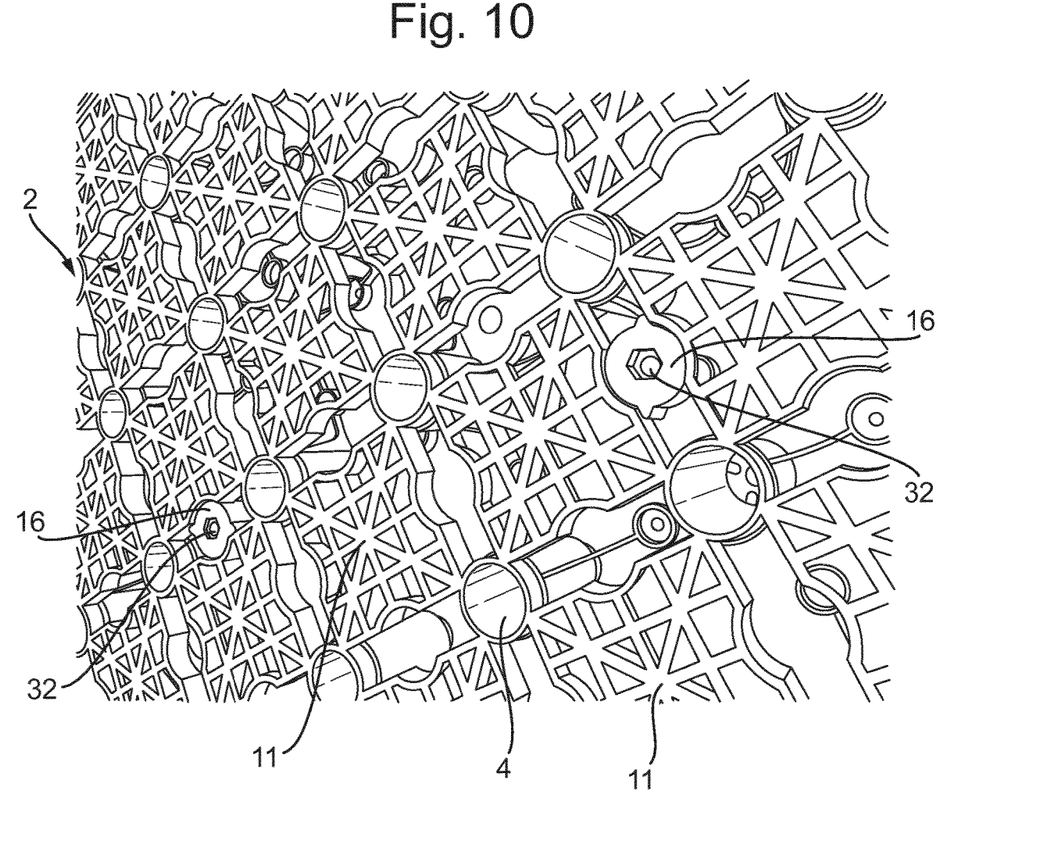

As can be seen in the drawings, for example in FIGS. 8 and 10, in embodiments the head 23 can fit snugly between the circle segment curved portions 8, whereas the upper end of the head can be substantially flush with or just below the surface P of the deck 2. The head 23 can be provided with an engagement provision 35 for engagement by a tool, such as a wrench, spanners or a screw driver. In the embodiment shown the head in the upper end is provided with an six sides opening for engagement by a hex key or Alan key for rotating the plug 16 around said axis L.

FIG. 7 schematically shows an artefact 100, by way of example shown as a bracket, bolted 101 to a plug 16 provided in an opening 9 in the support structure. As can be seen other plugs can be provided in other openings 9.

Figure 9:
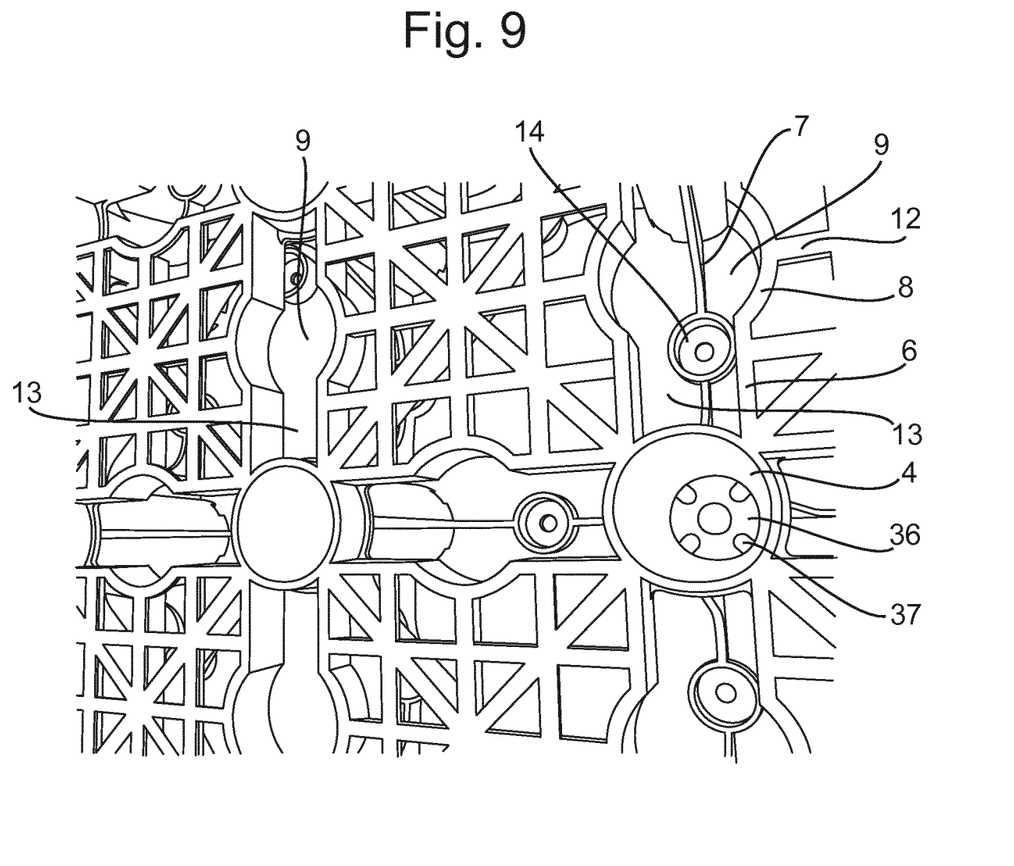
FIGS. 9 and 10 show a support structure, or at least part thereof, prior to and after mounting plugs in openings.
Figure 11:
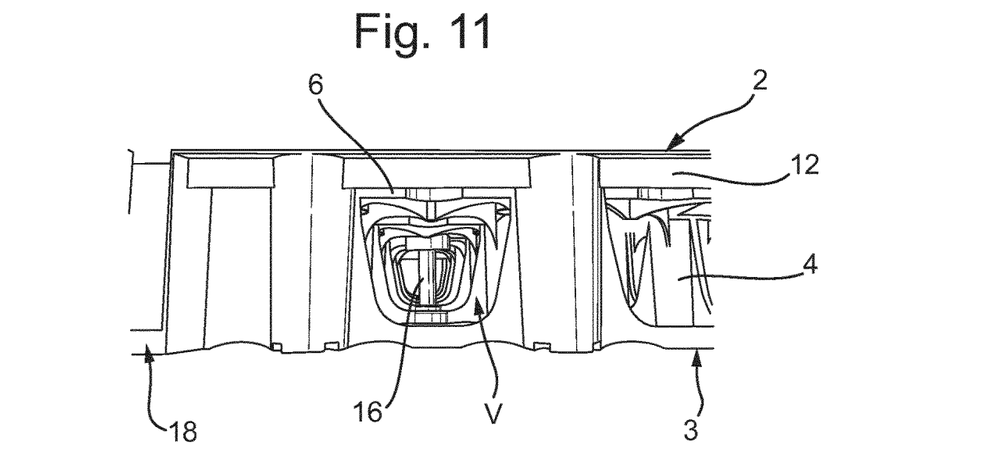
FIG. 11 shows in side view a base element with a plug mounted therein.

FIG. 9 shows part of the deck 2, with columns 4, wherein part of the bottom structure 3 can be seen, showing rib elements 7 and support elements 14. The columns 4 can have a bottom 36, which may be provided with openings 37 for allowing fluids to pass. As shown in e.g. FIG. 11 the plugs 16 extend through the void.

Figure 12:
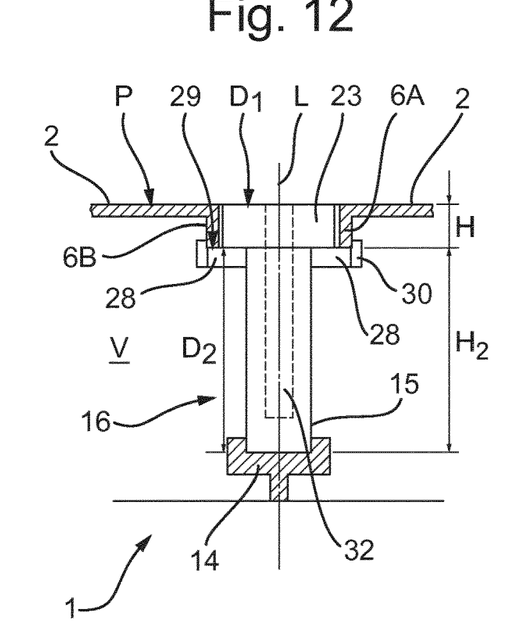
FIG. 12 shows in cross sectional side view an embodiment of a plug mounted in an opening.
Figure 13:
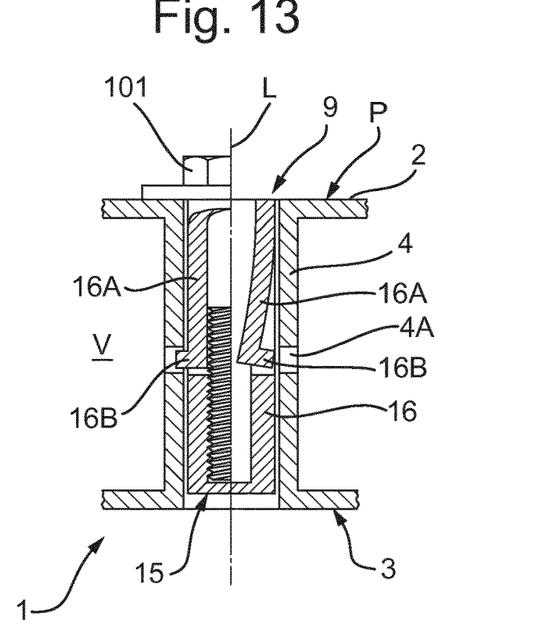
FIG. 13 shows in cross sectional side view an alternative embodiment of a plug mounted in an opening.
Figure 14:
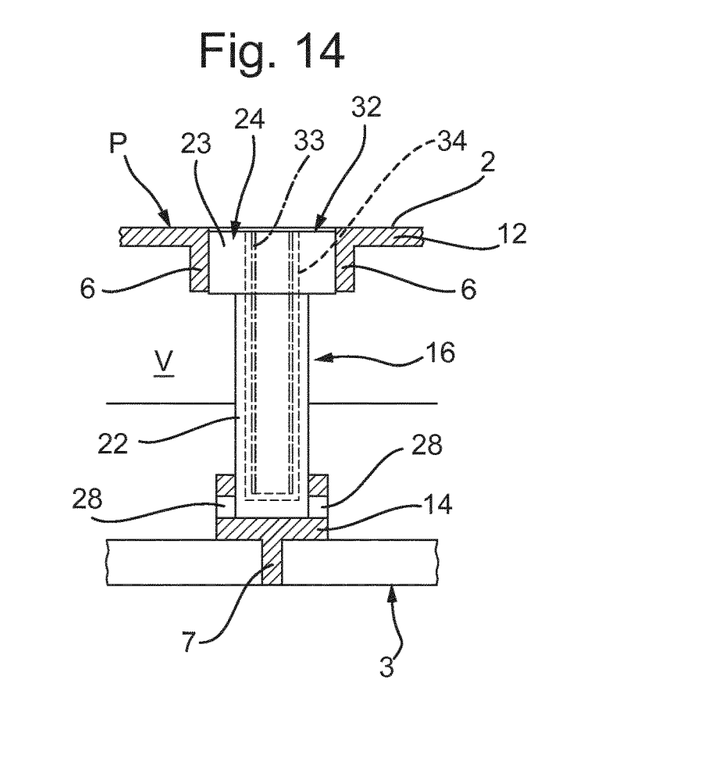
FIG. 14 shows in cross sectional side view an further embodiment of a plug mounted in an opening.

FIG. 12-14 show alternative embodiments of plugs 16 and parts of modules or base elements 1. In FIG. 12 a plug 16 is shown, in side view, in a locked position. The wing elements 28 extend below the rib elements 6, the lower end resting on the support element 14. The module 1 can advantageously be formed by single shot injection moulding since a two part mould can be used opening in a direction parallel to the axis L. The upper surface of the support elements 14 and rib elements 7 can be reached by a mould part through the opening 9 and open area 13 between the rib elements 6, whereas the ribs 6, 12 of the cells 11 can also be reached by the mould parts from opposite sides. As can be seen in broken lines in FIG. 12 an opening can extend through part of the plug 16 for forming or receiving a connector 32.

In FIG. 13 an alternative plug 16 is shown in an opening 9, which in this embodiment may be formed for example by a column 4 or by rib elements 6 as discussed. In FIG. 13 on the right hand side the plug 16 is shown without a bolt 101, in FIG. 13 on the left hand side with said bolt 101 inserted. The plug 16 in this embodiment is provided with at least one at least partly resilient arm 16A, which has a retaining element 16B which can fit into an opening 4A in the column 4 or below a rib element 6 for locking the plug 16 in the opening 9, e.g. formed by the column 4. The arm can bend into an interior space in the plug 16 when inserting the plug 16 into the opening. Then when the bolt 101 is inserted into the plug it forces the arm outward, positioning the retaining element 16B into the opening 4A or below said rib 6, preventing the plug 16 from rotating in and/or removal from the opening 9. In general such plug can be comparable to a wall plug as known in the art.

FIG. 14 schematically shows an embodiment of a plug 16 and module 1 in which the wing elements 28 are provided near the lower end 15 of the shaft, such that they can cooperate with the support element 14, similar to or as bayonet elements as known in the art. In this embodiment the upper end of the head 23 is slightly below the surface of the deck 2. In the is embodiment it is shown that the module 1 can be made differently, for example in two parts connected to each other, as for example known from WO0214608, WO2011/007128, WO2011/007127 and WO2015/135972.

Figure 15:
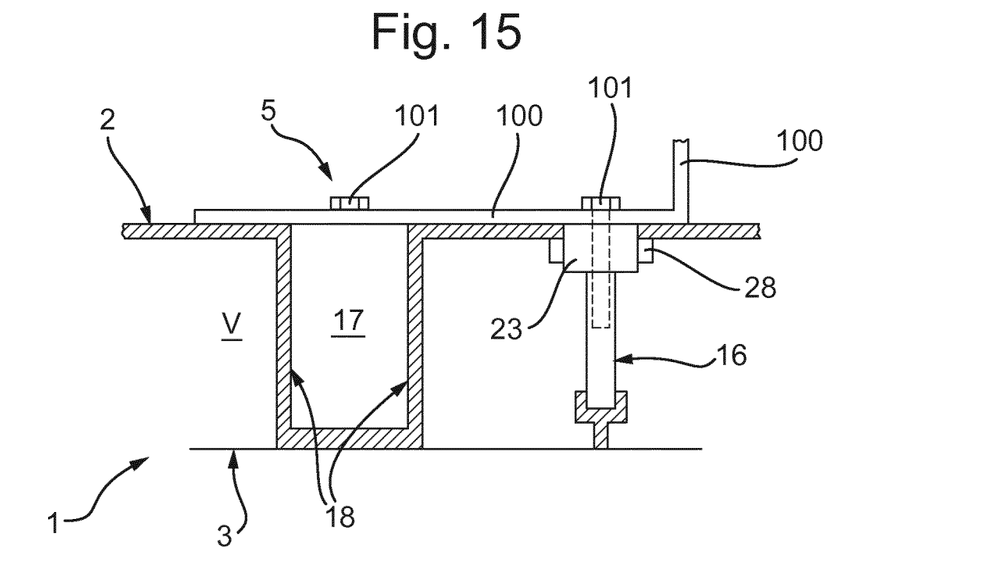
FIG. 15 shows in cross section part of an artefact mounted to a support structure using a plug mounted in an opening in a base element and as an addition or alternative, using a plug in a slot for connecting base elements to each other.

FIG. 15 shows schematically a further alternative embodiment, in which an artefact 100 is mounted to the support structure. In this embodiment two means for mounting the artefact are shown, which may be used in combination or as alternatives. At the right hand side a plug 16 is shown as basically discussed here before. At the left hand side an alternative is shown. As discussed before, the modules 1 can be provided with slots 18, especially substantially dove tail shaped slots, for receiving connecting elements 17. In this embodiment one such connecting element 17 is used as a plug 16 for mounting the artefact 100. The connecting element can for example be provided with a connector similar to or identical to that of the plugs as discussed before. Alternatively such connecting element can be connected in a different way to said artefact or can be an integral part thereof. By using the slot(s) 18 of one or more modules 1 in mounting artefacts 100 securing and stabilization or further securing can be obtained in a convenient manner. Moreover a combined interconnecting modules and mounting of an artefact or at least providing for a connector for such artefact can be obtained. This can for example especially but not exclusively be useful in mounting artefacts which may be prone to relatively high forces, such as for example fences, boardings, walls, goals and the like.

Figure 16:
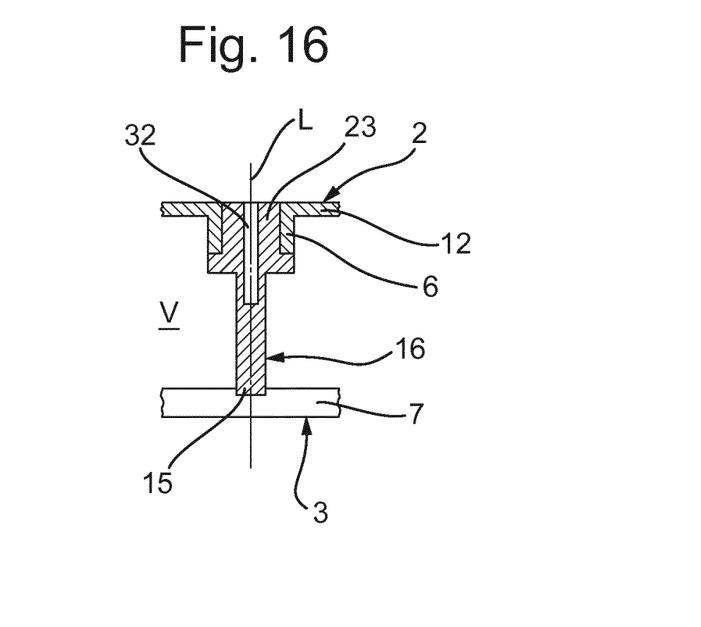
FIG. 16 shows a plug insert moulded into a module.

FIG. 16 shows schematically part of an embodiment which has a general configuration according to any one of the previous embodiments, in which the plug 16 with the connector is provided in at least one of the openings as an insert, moulded into the module 1. The module 1 can be injection moulded, as discussed, with a plug 16 insert moulded into the deck, especially in an opening in said deck of the module 1 and/or in a slot 18. In these embodiments the plug can partly or entirely close off the opening in which it is provided. The plug can comprise or be formed by the connector or a connector body. The plug can for example be provided for by insert moulding or by 2K moulding or any other suitable means.

In embodiments shown a lower end of the plug can supported in a support element. It will be clear that such lower end can also be supported by fitting at least partly over such support element. For example but not limited to by providing a slit in said lower end of the plug which can fit over a rib or the like support element of the base element or a pin or the like provided by or on such rib or the like support element fitting into the lower end of the plug.

In general terms a plug 16 according to the disclosure can preferably be inserted into and/or through an opening in the base elements 1, especially an opening in the deck thereof, preferably in a direction substantially perpendicular to the deck 2, wherein the plug 16, preferably at or near a lower end thereof, is supported by a further element 7 of the base element 1, such as a rib 7 of a bottom structure, such that the plug is at least prevented from tilting relative to the deck. Moreover the plug 16 may be enclosed between the deck 2 and said further supporting element 14, 7, such that it can substantially not move in a longitudinal direction of the plug, i.e. in a direction parallel to the longitudinal axis L thereof, between the deck and said support element 7, 14. Thus an artefact can be connected to such plug which may be subject to forces in various directions, which can be counteracted by said plug.

In the embodiments plugs can be provided in any one of the openings provided by choice, preferably prior to arranging the modules into a support structure. However, with the embodiments in which the plug is a separate part plugs can be mounted in said openings after at least part of the structure has been provided for. In embodiments both plugs insert moulded and plugs inserted afterwards can be combined.

The present invention is by no means limited to the embodiments specifically disclosed in the drawings and description. Many variations are possible within the scope as defined by the claims. For example all combinations of parts of the embodiments shown in the drawings are considered to have been disclosed too. Base elements or modules as disclosed can be made by any methods and from different materials. Modules can be coupled in different manners and different ways or can be placed next to each other without coupling. They can be positioned in different orientations relative to each other, for example in a "half-stone", staggered relationship for even more rigid connections. Modules can be made generally as disclosed in for example WO0214608, WO2011/007128, WO2011/007127 and WO2015/135972. Modules can be stacked for obtaining a larger internal volume V in the structure. Plugs can be used having more than one connector, for example side by side and/or of different configuration, such as but not limited to screw threads and bayonet provisions, for cooperating with different artefacts. Connectors can be provided having a direction of insertion for a connecting element different from substantially perpendicular to the deck, as shown in the drawings, for example by providing the connector having a longitudinal axis $X_{plug}$ which is parallel to such insertion direction, and which extends at an angle with the longitudinal axis of the plug itself, which may be parallel to a direction of insertion thereof into the deck. The modules can have different shapes and dimensions, for example polygonal. Preferably they can be coupled such that they can form a substantially continuous surface area. These and many such variations are considered falling within the scope of the claims.

The invention claimed is:

1. A support structure for a surface area, comprising an array of base elements, interconnected for forming the support structure defining a deck, the base elements comprising at least one void for receiving a fluid and wherein the deck is provided with at least one first opening for passing fluids into and/or from said void and at least one slot opening for interconnecting the base elements, wherein the support structure further comprises a plug, wherein in the at least one first opening or in the at least one slot opening said plug has been provided, said plug being provided with a connector for connecting an artefact to said plug, wherein the plug is provided with at least one wing element which extends outward from a body of the plug, such that in a first rotational position of the plug said wing element locks the plug in said at least one first opening or in said at least one slot opening, and in a second rotational position of said plug said wing element is configured to pass through said at least one first opening or through said at least one slot opening for placing and/or removing said plug from said at least one first opening or from said at least one slot opening, and wherein the support structure is arranged such that said plug is configured to be rotated within said at least one first opening or within said at least one slot opening around a longitudinal axis of said plug body for bringing the plug from the first position into the second position or vice versa.

2. The support structure according to claim 1, wherein the at least one plug is releasably connected to one of the base elements, wherein the connector is accessible from an upper side of the deck.

3. The support structure according to claim 1, wherein the at least one plug has an upper end which is flush with or below an upper side of said deck.

4. The support structure according to claim 1, wherein the plug is provided with stop element for limiting the rotation of the plug in the at least one first opening or in the at least one slot opening.

5. The support structure according to claim 1, wherein the support structure is arranged such that said at least one wing element is configured to be rotated to the second position below the deck and/or below a bottom element of the base element by rotation of the plug from the second position to the first position.

6. The support structure according to claim 1, wherein the plug has a lower end portion which is supported in and/or on a part of the base element below said at least one first opening or below said at least one slot opening.

7. The support structure according to claim 1, wherein the connector comprises at least one of screw threads and bayonet elements on said plug body for cooperation with complementary screw threads or bayonet elements of said artefact.

8. The support structure according to claim 1, wherein each base element further comprises a bottom structure interconnected with the deck by at least an array of columns.

9. The support structure according to claim 8, wherein the bottom structure comprises a series of intersecting rib elements, wherein at least one of said rib elements is provided with a support element directly below the at least one first opening or below the at least one slot opening in said deck structure.

10. The support structure according to claim 9, wherein at least some of the series of rib elements intersect at at least one column of the array of columns extending between said bottom structure and said deck, and wherein said support element is provided spaced apart from said at least one column.

11. The support structure according to claim 1, wherein the deck comprises at least a series of intersecting rib elements, wherein said at least one first opening or said at least one slot opening is defined by at least two of the series of rib elements extending substantially parallel to each other in said deck.

12. The support structure according to claim 1, wherein the deck has an open structure.

13. The support structure according to claim 1, wherein the support structure is provided with the artefact, and wherein the artefact is connected to said support structure by connecting said artefact to the connecting element of the at least one plug.

14. The support structure according to claim 1, wherein at least one surface layer is provided over the deck, wherein said at least one plug is accessible through said at least one surface layer.

15. The support structure according to claim 1, wherein each base element is provided with an array of said first openings, and/or one or more of the plugs integral to the base element.

16. A support structure for a surface area, comprising an array of base elements, interconnected for forming the support structure defining a deck, the base elements comprising at least one void for receiving a fluid and wherein the deck is provided with at least one first opening for passing fluids into and/or from said void and at least one slot opening for interconnecting the base elements, wherein the support structure further comprises a plug, wherein in the at least one first opening said plug has been provided, said plug being provided with a connector for connecting an artefact to said plug, wherein the plug is provided with at least one wing element which extends outward from a body of the plug, such that in a first rotational position of the plug said wing element locks the plug in said at least one first opening, and in a second rotational position of said plug said wing element is configured to pass through said at least one first opening for placing and/or removing said plug from said at least one first opening, and wherein the support structure is arranged such that said plug is configured to be rotated within said at least one first opening around a longitudinal axis of said plug body for bringing the plug from the first position into the second position or vice versa.

* * * * *